(12) United States Patent
Abedini et al.

(10) Patent No.: US 10,530,623 B2
(45) Date of Patent: Jan. 7, 2020

(54) REFERENCE SIGNAL DESIGN

(71) Applicant: QUALCOMM Incorporated, San Diego, CA (US)

(72) Inventors: Navid Abedini, Raritan, NJ (US); Muhammad Nazmul Islam, Edison, NJ (US); Bilal Sadiq, Basking Ridge, NJ (US); Peter Gaal, San Diego, CA (US); Haitong Sun, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/028,312

(22) Filed: Jul. 5, 2018

(65) Prior Publication Data

US 2019/0021062 A1  Jan. 17, 2019

Related U.S. Application Data

(60) Provisional application No. 62/532,851, filed on Jul. 14, 2017.

(51) Int. Cl.
| | |
|---|---|
| *H04L 27/26* | (2006.01) |
| *H04J 11/00* | (2006.01) |
| *H04L 5/00* | (2006.01) |
| *H04W 56/00* | (2009.01) |

(Continued)

(52) U.S. Cl.
CPC ...... *H04L 27/2613* (2013.01); *H04J 11/0073* (2013.01); *H04J 11/0076* (2013.01); *H04L 5/005* (2013.01); *H04L 5/0048* (2013.01); *H04L 5/0051* (2013.01); *H04L 5/0053* (2013.01); *H04L 27/2657* (2013.01);
(Continued)

(58) Field of Classification Search
CPC . H04L 27/2613; H04L 27/2657; H04L 5/005; H04L 5/0051; H04L 5/0048; H04L 5/0053; H04J 11/0073; H04J 11/0076; H04W 72/046; H04W 72/005; H04W 56/001; H04W 56/0015
USPC .......................................... 375/262
See application file for complete search history.

(56) References Cited

U.S. PATENT DOCUMENTS

| | | | |
|---|---|---|---|
| 2010/0103858 A1* | 4/2010 | Palanki | H04B 7/15507 370/315 |
| 2010/0182903 A1* | 7/2010 | Palanki | H04L 1/0041 370/225 |

(Continued)

OTHER PUBLICATIONS

International Search Report and Written Opinion—PCT/US2018/041244—ISA/EPO—dated Oct. 16, 2018.
(Continued)

*Primary Examiner* — Juan A Torres
(74) *Attorney, Agent, or Firm* — Patterson & Sheridan, LLP

(57) ABSTRACT

Certain aspects of the present disclosure relate to methods and apparatus for generating and communicating reference signals. Certain aspects provide a method for communicating reference signals. The method includes selecting a demodulation reference sequence (DMRS) of a plurality of DMRSs for transmission in a synchronization signal block (SSB) based on a half-frame in which the SSB is transmitted. The method further includes transmitting the selected DMRS in the SSB.

28 Claims, 13 Drawing Sheets

(51) Int. Cl.
*H04W 72/00* (2009.01)
*H04W 72/04* (2009.01)
(52) U.S. Cl.
CPC ..... *H04W 56/001* (2013.01); *H04W 56/0015* (2013.01); *H04W 72/005* (2013.01); *H04W 72/046* (2013.01)

(56) References Cited

U.S. PATENT DOCUMENTS

| | | | | |
|---|---|---|---|---|
| 2015/0189541 | A1* | 7/2015 | Palanki | H04L 1/0041 |
| | | | | 370/230 |
| 2015/0365201 | A1 | 12/2015 | Lunttila et al. | |
| 2017/0251460 | A1 | 8/2017 | Agiwal et al. | |
| 2017/0325260 | A1 | 11/2017 | Guo et al. | |
| 2017/0331670 | A1 | 11/2017 | Parkvall et al. | |
| 2017/0353254 | A1 | 12/2017 | Islam et al. | |
| 2018/0248642 | A1* | 8/2018 | Si | H04L 5/0053 |
| 2018/0324022 | A1* | 11/2018 | Sheng | H04L 5/0053 |
| 2018/0368054 | A1* | 12/2018 | Sheng | H04W 48/10 |
| 2018/0376454 | A1* | 12/2018 | strom | H04L 5/0005 |
| 2019/0020517 | A1 | 1/2019 | Abedini et al. | |
| 2019/0058620 | A1* | 2/2019 | Liu | H04W 48/16 |

OTHER PUBLICATIONS

LG Electronics: "Discussion on DMRS Design for NR-PBCH", 3GPP Draft; R1-1710264 Discussion on DMRS Design for NR-PBCH_Final, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299481, Retrieved from the Internet: URL:http://www.3gpp.org/ftp/Meetings_3GPP_SYNC/RAN1/Docs/ [retrieved on Jun. 26, 2017], 7 pages.

Nokia et al: "SS block time index indication", 3GPP Draft; R1-1711262, 3rd Generation Partnership Project (3GPP), Mobile Competence Centre ; 650, Route Des Lucioles ; F-06921 Sophia-Antipolis Cedex ; France, vol. RAN WG1, No. Qingdao, P.R. China; Jun. 27, 2017-Jun. 30, 2017, Jun. 26, 2017 (Jun. 26, 2017), XP051300457, 4 pages, Retrieved from the Internet: URL:http://www.3gpp.org/ftp/Meetings_3GPP_SYNC/RAN1/Docs/ [retrieved on Jun. 26, 2017].

Samsung: "Sequence Design of DMRS for NR-PBCH", 3GPP Draft; R1-1710629, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299836, Retrieved from the Internet: URL:http://www.3gpp.org/ftp/Meetings_3GPP_SYNC/RAN1/Docs/ [retrieved on Jun. 26, 2017], 3 pages.

Xinwei: "Discussion on timing indication based on SS block", 3GPP Draft; R1-1710223 Discussion on Timing Indication Based on SS Block, 3rd Generation Partnership Project (3GPP), Mobile Competence Centre ; 650, Route Des Lucioles ; F-06921 Sophia-Antipolis Cedex, vol. RAN WG1, No. Qingdao; Jun. 27, 2017-Jun. 30, 2017, Jun. 26, 2017 (Jun. 26, 2017), XP051299444, 6 pages, Retrieved from the Internet: URL:http://www.3gpp.org/ftp/Meetings_3GPP_SYNC/RAN1/Docs/ [retrieved on Jun. 26, 2017].

ZTE: "Timing indication based on ss blocks", 3GPP Draft; R1-1709886, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27-Jun. 30, 2017, Jun. 26, 2017 (Jun. 26, 2017), XP051299111, 8 pages, Retrieved from the Internet: URL:http://www.3gpp.org/ftp/Meetings_3GPP_SYNC/RAN1/Docs/ [retrieved on Jun. 26, 2017].

* cited by examiner

REFERENCE SIGNAL DESIGN

CROSS-REFERENCE TO RELATED APPLICATIONS

This application claims the benefit of U.S. Provisional Patent No. 62/532,851, filed Jul. 14, 2017. The content of the provisional application is hereby incorporated by reference in its entirety.

INTRODUCTION

Technical Field

Aspects of the present disclosure relate to communication systems, and more particularly, to methods and apparatuses for generating and communicating reference signals.

Background

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for communicating reference signals. The method includes selecting a demodulation reference sequence (DMRS) of a plurality of DMRSs for transmission in a synchronization signal block (SSB) based on a half-frame in which the SSB is transmitted. The method further includes transmitting the selected DMRS in the SSB.

Certain aspects provide a wireless device comprising a memory and a processor. The processor is configured to select a demodulation reference sequence (DMRS) of a plurality of DMRSs for transmission in a synchronization signal block (SSB) based on a half-frame in which the SSB is transmitted. The processor is further configured to transmit the selected DMRS in the SSB.

Certain aspects provide a wireless device. The wireless device includes means for selecting a demodulation reference sequence (DMRS) of a plurality of DMRSs for transmission in a synchronization signal block (SSB) based on a half-frame in which the SSB is transmitted. The wireless device further includes means for transmitting the selected DMRS in the SSB.

Certain aspects provide a non-transitory computer readable storage medium that stores instructions that when executed by a wireless device cause the wireless device to perform a method for communicating reference signals. The method includes selecting a demodulation reference sequence (DMRS) of a plurality of DMRSs for transmission in a synchronization signal block (SSB) based on a half-frame in which the SSB is transmitted. The method further includes transmitting the selected DMRS in the SSB.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
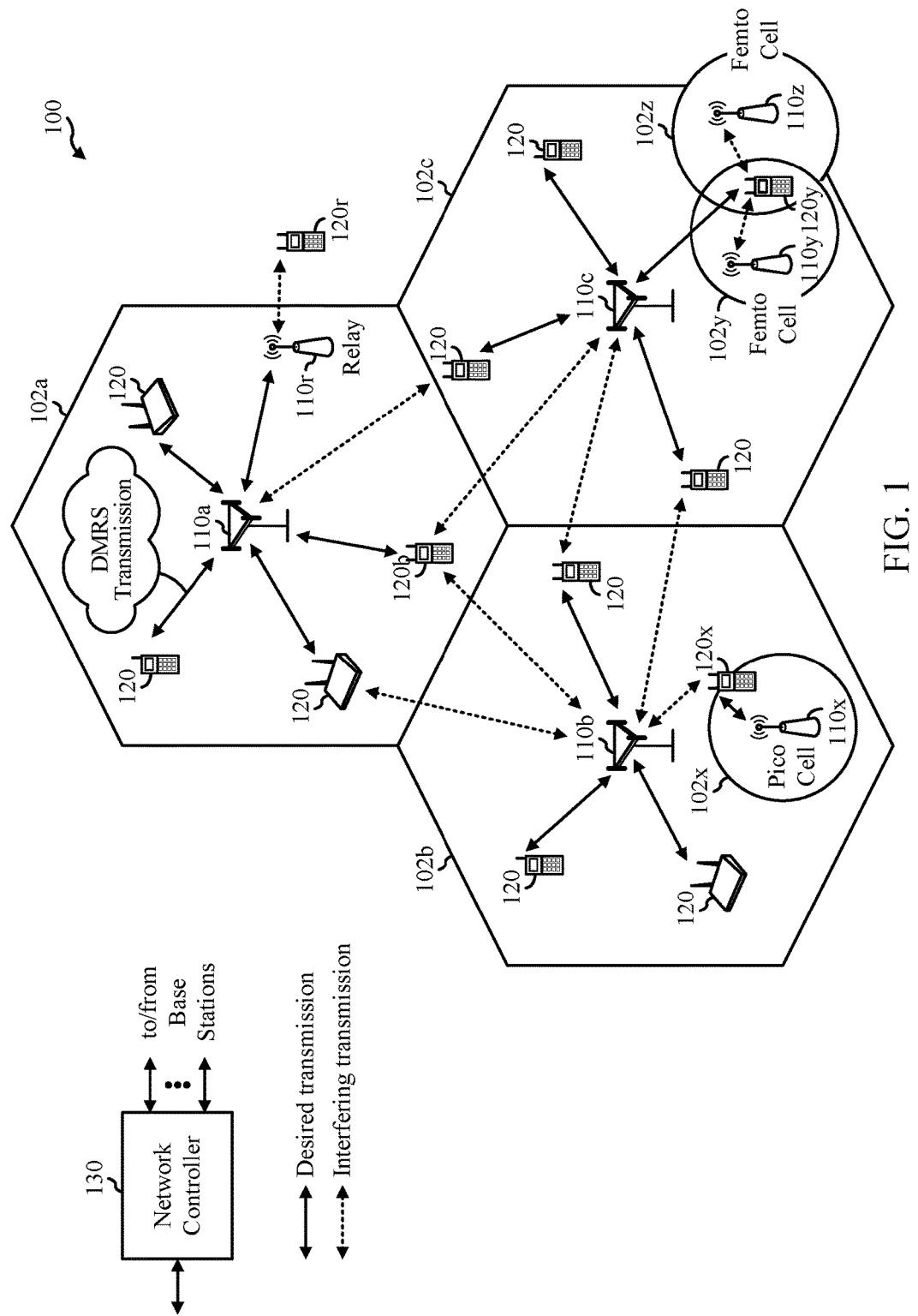
FIG. 1 is a block diagram conceptually illustrating an example telecommunications system, in accordance with certain aspects of the present disclosure.

Aspects of the present disclosure relate to conveying timing information regarding a cell to a UE. For example, a base station may generate and transmit reference signals (e.g., a primary synchronization signal (PSS), a secondary synchronization signal (SSS), and/or a demodulation reference signal (DMRS)) for each cell supported by the base station. The reference signals may be used by UEs for cell detection and acquisition. The base station may also send a Physical Broadcast Channel (PBCH). The PBCH may carry certain system information. The DMRS may be used for channel estimation and demodulation of the PBCH. In certain aspects, the transmission of the reference signals is used to convey timing information of the cell to the UE. The UE may utilize the timing information for synchronization and timing reference for communicating in the cell. Certain aspects herein relate to communicating information, such as timing information, to the UE based on the design of reference sequences transmitted in the cell.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, BSs of network 100 may transmit reference signals to UEs of network 100 to communicate information, such as timing information, to the UEs based on the design of reference sequences transmitted in a cell by the BS.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
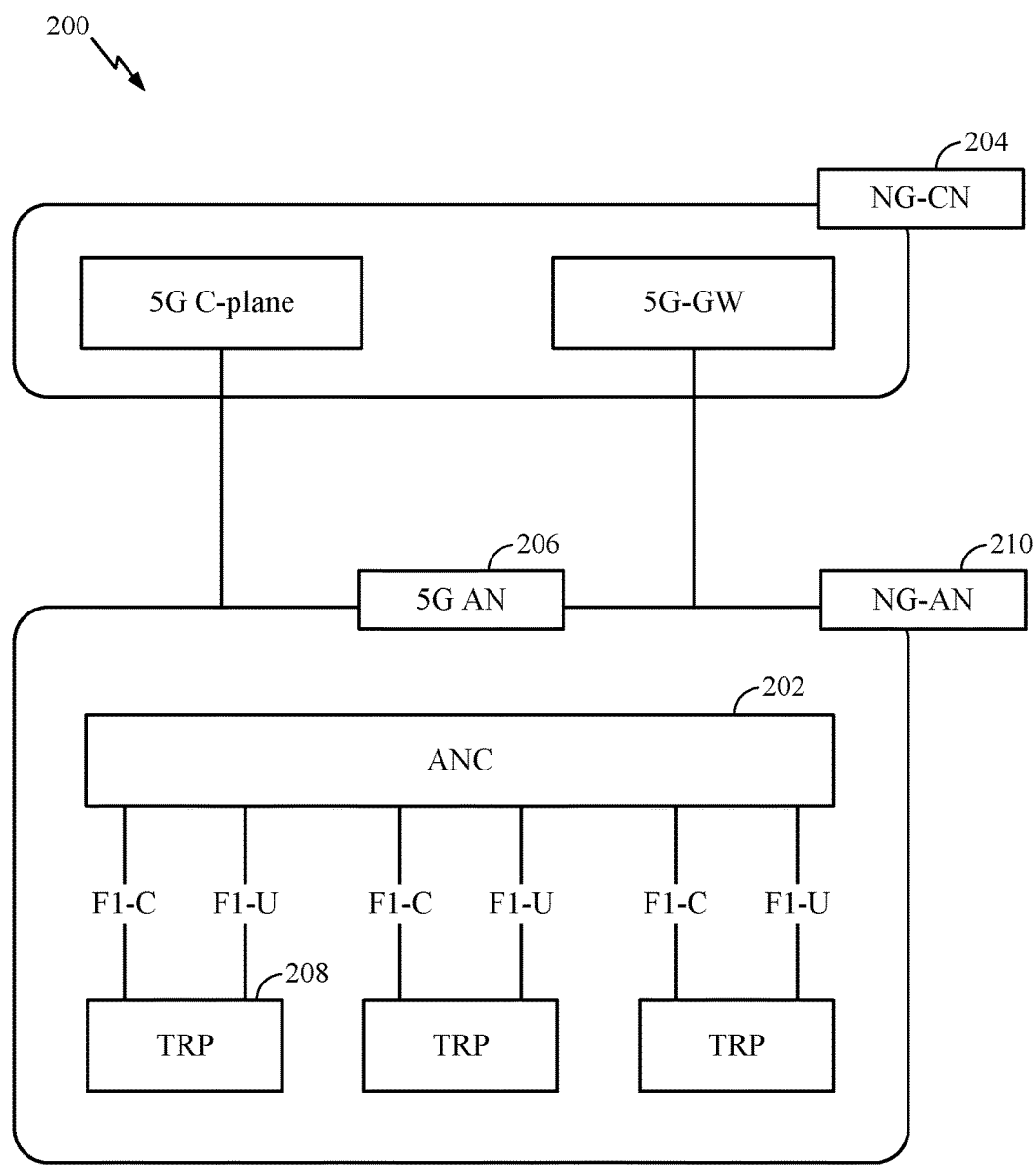
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
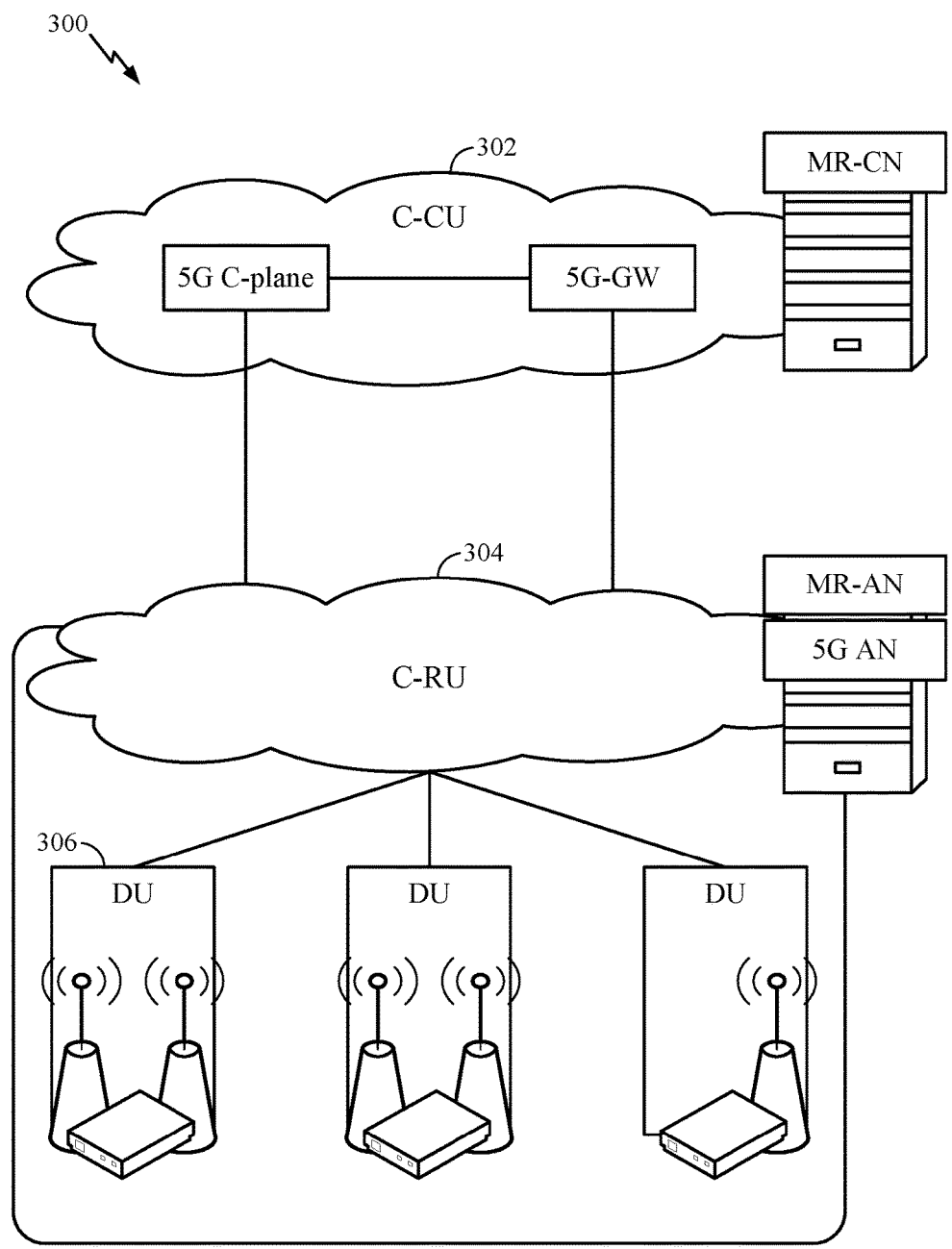
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
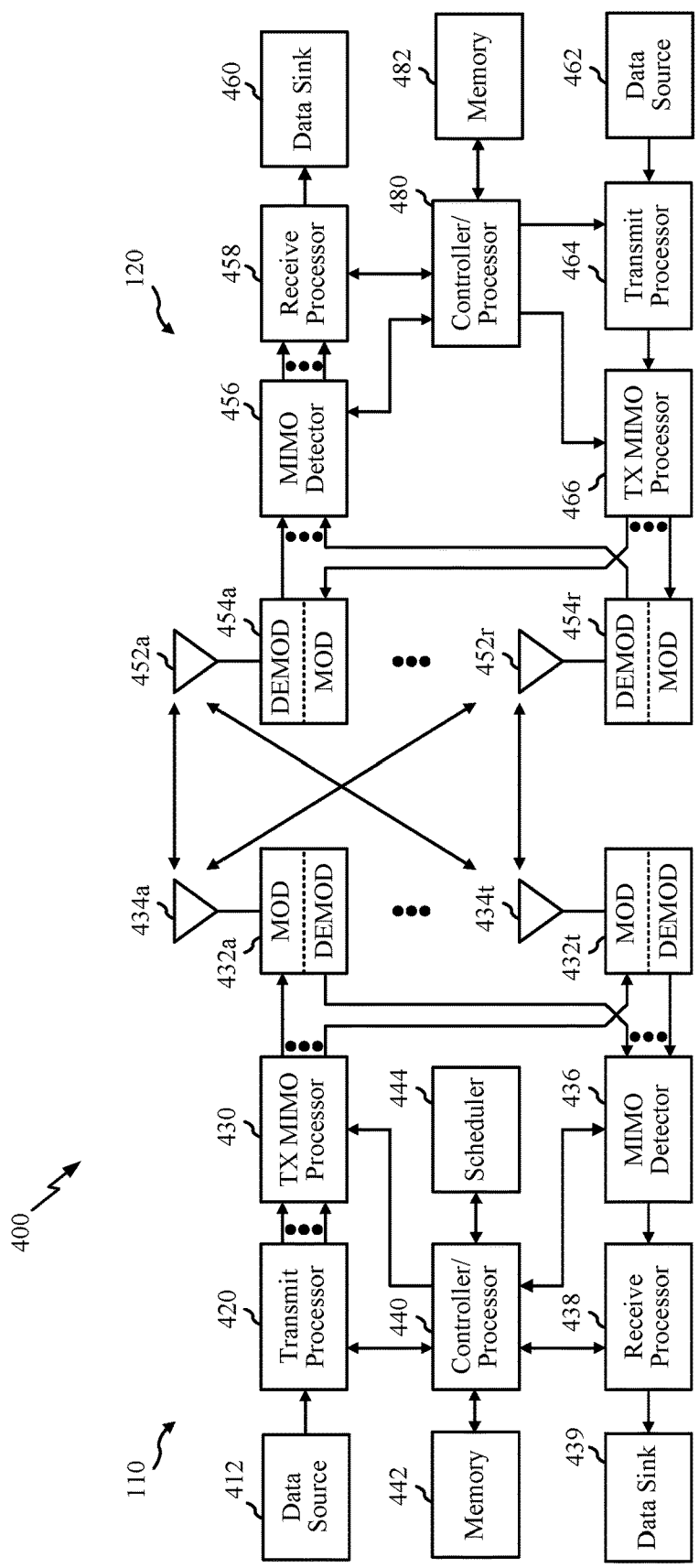
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 432a through 432t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
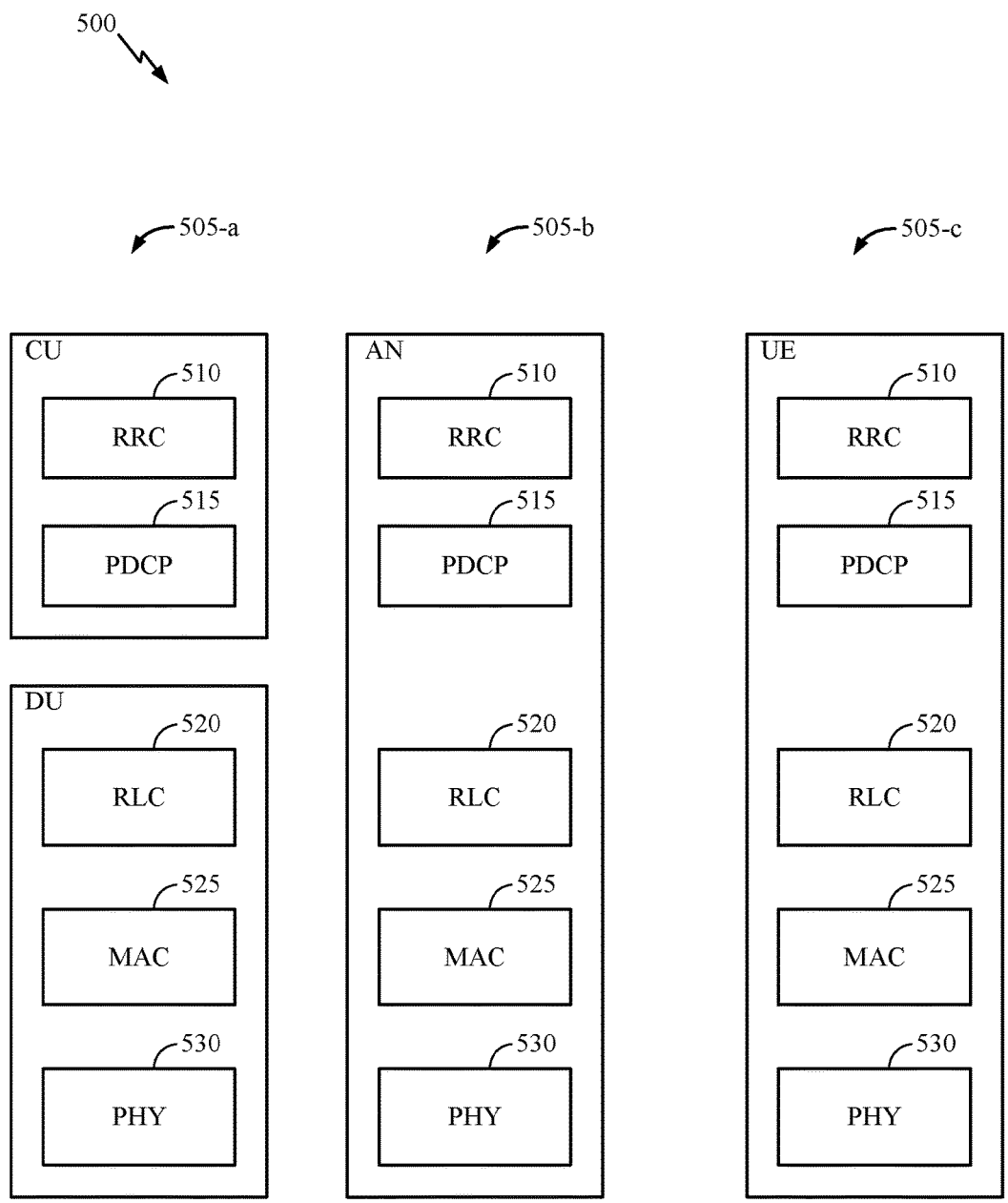
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-a shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-a may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 kHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
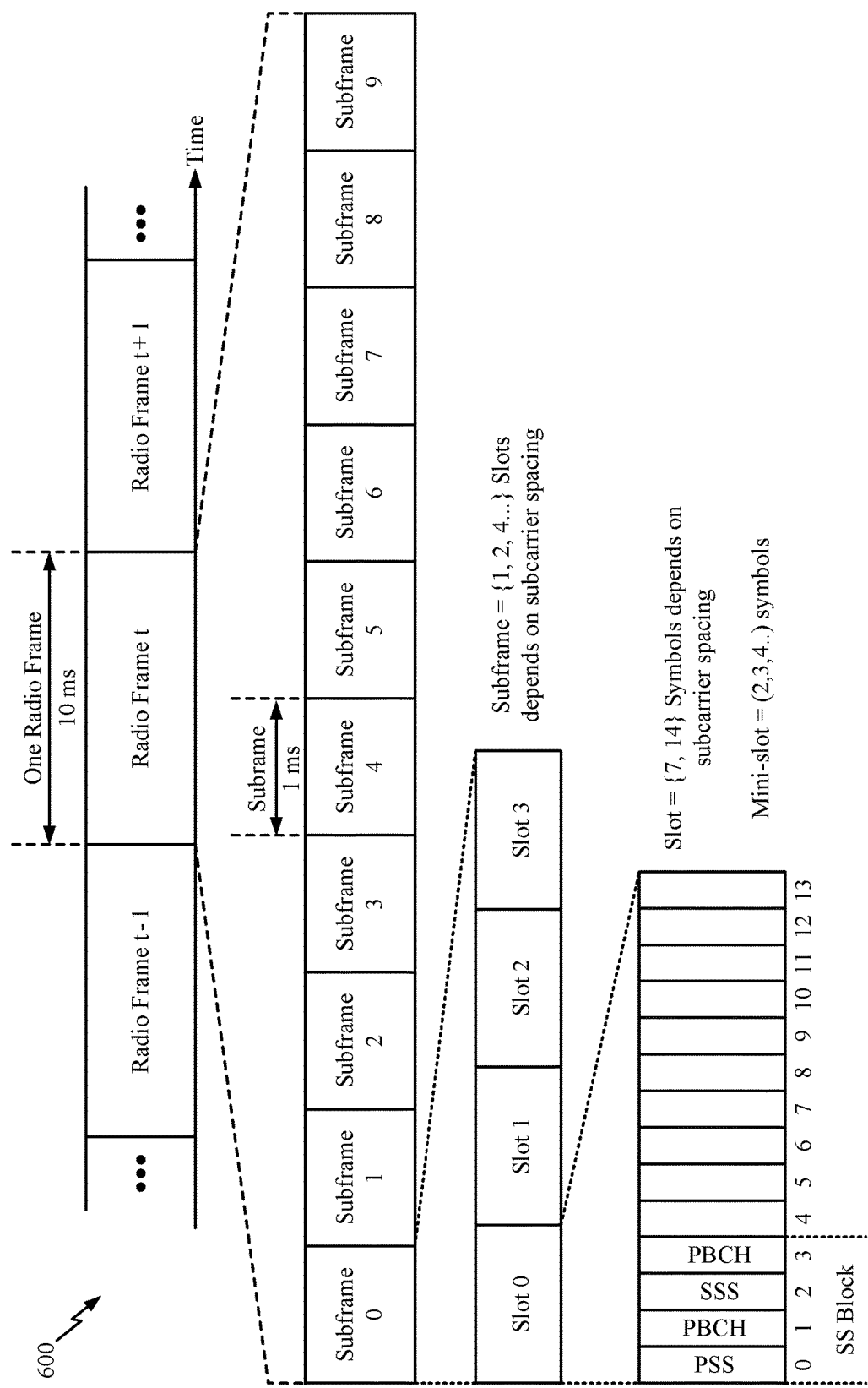
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Demodulation Reference Signal Design

Aspects of the present disclosure relate to conveying timing information regarding a cell to a UE. For example, a BS may generate and transmit reference signals (e.g., a PSS, a SSS, and/or a DMRS) for each cell supported by the BS.

Figure 7:
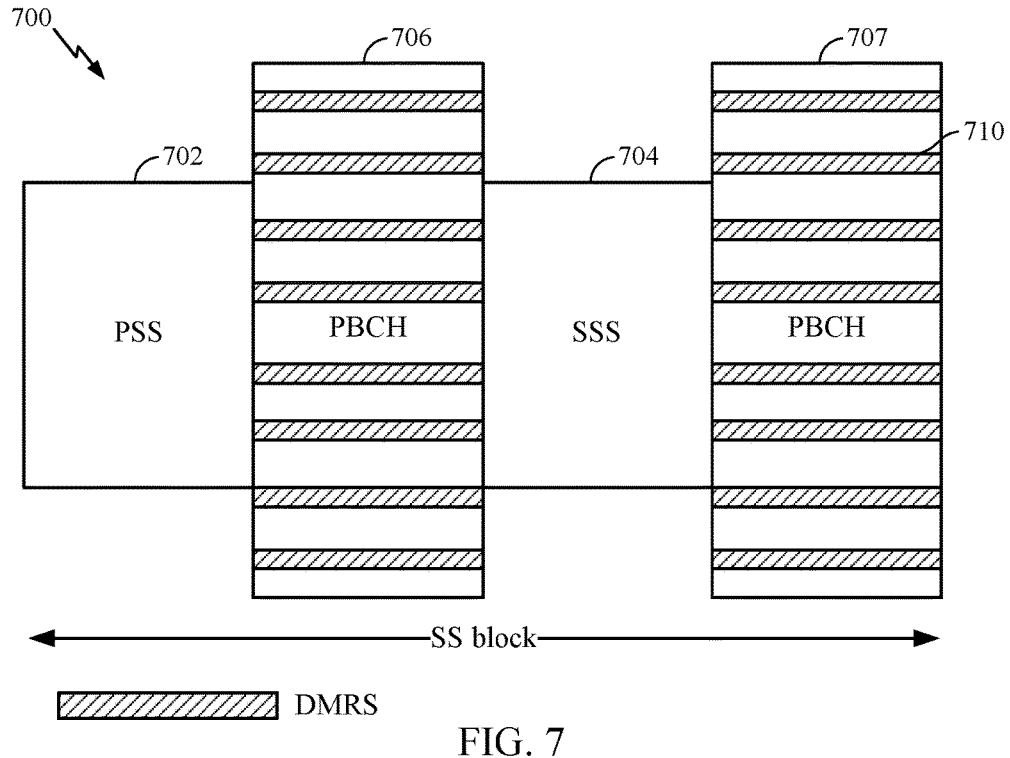
FIG. 7 illustrates an example of a synchronization signal block (SSB), in accordance with certain aspects.

In certain aspects, a BS (e.g., BS 110 described with respect to FIG. 1) is configured to transmit reference signals in blocks, which may be referred to as synchronization signal blocks (SSBs). FIG. 7 illustrates an example of a SSB 700, in accordance with certain aspects. The X-axis in the illustration of FIG. 7 indicates time (e.g., symbols), and the Y-axis indicates frequency (e.g., tones). As shown, SSB 700 includes a PSS 702, a SSS 704, a PBCH 706, and a PBCH 707 multiplexed in the time domain and allocated to certain frequency ranges. In certain aspects, the PSS 702 and SSS 704 are allocated to the same frequency range. Further, in certain aspects, the PBCH 706 and PBCH 707 are allocated to the same frequency range. In certain aspects, the PSS 702 and SSS 704 are allocated to a portion (e.g., half) of the frequency range of the PBCH 706 and PBCH 707. Though shown in a particular order in SSB 700 and of particular durations and frequency allocations, it should be noted that the order, durations, and frequency allocations of the PSS 702, SSS 704, PBCH 706, and PBCH 707 may be different. Further, the SSB 700 may include additional or fewer reference signals or additional or fewer PBCH. Further, in certain aspects, for each of PBCH 706 and PBCH 707, certain portions (e.g., frequency ranges, tones, resource elements (REs)) are allocated to transmission of reference sequences, such as in DMRS 710. It should be noted that though certain aspects are described herein with respect to a DMRS in a SSB, other types of reference sequences may similarly be selected and included in the SSB instead. In certain aspects, the allocation may be different than shown in FIG. 7.

Though not shown a SSB may include additional or fewer signals, channels, etc. than shown. For example, a SSB may further include a third synchronization signal (TSS) or a beam reference signal.

In certain aspects, multiple SSBs (e.g., SSB 700) may be assigned to a set of resources to transmit the multiple SSBs (such a set of resources for transmitting multiple SSBs may be referred to herein as a SS burst set). The multiple SSBs may be assigned to periodic resources (e.g., every 20 ms) and transmitted periodically by a BS (e.g., BS 110) in a cell. For example, a SS burst set may include a number L of SSBs (e.g., 4, 8, or 64). In certain aspects the number L of SSBs included in a SS burst set is based on the frequency band used for transmission. For example, for sub 6 GHz frequency transmissions, L may equal 4 or 8. In another example, for transmission above 6 GHz, L may equal 64. For example, transmission by the BS 110 in a cell may be beamformed, so that each transmission only covers a portion of the cell. Therefore, different SSBs in a SS burst set may be transmitted in different directions so as to cover the cell.

Figure 8:
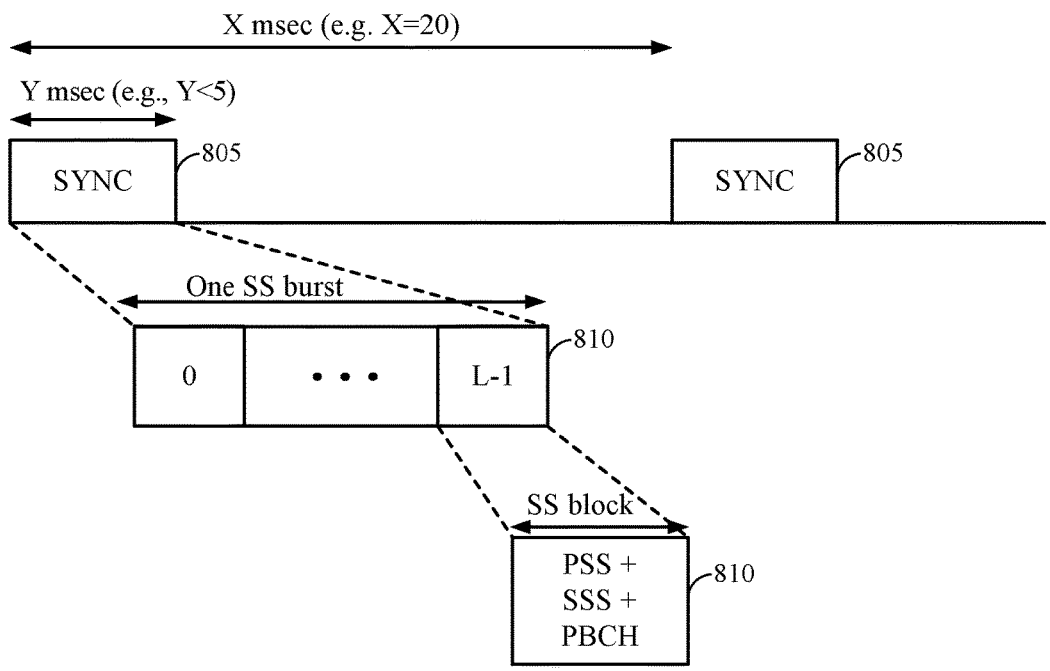
FIG. 8 illustrates an example of the timing of transmission of SSBs, in accordance with certain aspects.

FIG. 8 illustrates an example of the timing of transmission of SSBs, in accordance with certain aspects. As shown, a SS burst set 805 may be transmitted periodically every X msec (e.g., X=20). Further, the SS burst set 805 may have a duration of Y msec (e.g., Y<5), wherein all of the SSBs 810 in the SS burst set 805 are transmitted within the duration Y. As shown in FIG. 8, each SSB 810 includes a PSS, SSS, and PBCH. SSB 810 may for example, correspond to a SSB 700. SS burst set 805 includes a maximum of L SSBs 810 each having a corresponding SSB index (e.g., 0 through L−1) indicating its location within the SS burst set, e.g. indicating the physical transmission ordering in time of the SSBs 810. Though the SSBs 810 are shown allocated in time consecutively in SS burst set 805, it should be noted that the SSBs 810 may not be allocated consecutively. For example, there may be separation in time (e.g., of the same or different durations) between the SSBs 810 in the SS burst set 805. The allocation of time of the SSBs 810 may correspond to a particular pattern, which may be known to the BS 110 and UE 120.

In certain aspects, a SSB transmitted by a BS 110 to a UE 120 is used to convey timing information about a cell served by the BS 110 to the UE 120. For example, in certain aspects, the SSB is used to indicate the system frame number (SFN) level timing in the cell. In an example, the periodic timing in the cell may be divided into system frames (e.g., 1024 system frames having a duration of 10 ms each). Therefore, each system frame is assigned a sequential number (e.g., from 0-1023). In this example, the SSB is used to convey bits (e.g., 10 bits corresponding to $2^{10}$ system frames) of information (e.g., in a payload of the SSB, based on a configuration of the SSB, etc.) to indicate the SFN in which the SSB is transmitted, so the UE has timing information to the SFN level (e.g., 10 ms level of timing).

In certain aspects, the SSB may additionally be used to convey information about the timing within a system frame (e.g., sub-10 ms timing). For example, the SSB may be used to convey an additional bit (e.g., an $11^{th}$ bit) (e.g., in a payload of the SSB, based on a configuration of the SSB, etc.) to indicate a half system frame (e.g., 5 ms) interval level of timing (e.g., indicating the first half/preamble of the system frame or the second half/mid-amble of the system frame in which the SSB is transmitted).

In certain aspects, the bits for SFN level timing and additional bit for half SFN level timing may be sufficient to indicate the timing of transmission of a SS burst set (e.g., 5 ms). However, these bits may not be sufficient to indicate the timing level within the SS burst set. Accordingly, in certain aspects, the timing level within the SS burst set may be indicated by the index of the individual SSBs transmitted in the SS burst set. For example, as discussed, a UE 120 has information regarding the pattern of the SSBs in the SS burst set. Accordingly, if the UE 120 has information regarding when a SSB having a particular SSB index is transmitted within the SS burst set, and determines the SSB index of a received SSB, it can determine the timing within the SS burst set synchronized to the received SSB. Therefore, in certain aspects the SSB may additionally be used to convey bits of information indicative of the SSB index of the SSB. For example, where there is a maximum of L=64 SSBs, an additional 6 bits (e.g., $2^6$32 64) may be conveyed by the SSB to indicate the SSB index of the SSB. In certain aspects, therefore, the SSB may convey 17 bits (e.g., 10+1+6) bits of information.

In certain aspects, a number of bits (e.g., 3 bits) may be conveyed based on a reference sequence, such as a DMRS sequence, used in a SSB. Though certain aspects are described with respect to a DMRS sequence, other types of sequences may be used. For example, there may be multiple candidate DMRS sequences (e.g., 8) that may be used for the DMRS in a SSB, and the actual DMRS transmitted in the SSB may be indicative of the value (e.g., 000 through 111) of the number of bits.

For example, in certain aspects, the DMRS is a function of the cell ID of the cell in which the BS 110 transmits the SSB. In certain aspects, the UE 120 utilizes the PSS and/or SSS in the SSB to determine the cell ID of the cell in which the SSB is transmitted. Further, for a given cell, there may be a number (e.g., 8) of candidate DMRS sequences that may be used. Therefore, the UE 120, based on the cell ID determined from the PSS and/or SSS may try correlating the received DMRS sequence in the SSB with each of the number of candidate DMRS sequences for the cell ID. The candidate DMRS sequence with the highest correlation to the received DMRS sequence in the SSB may be the DMRS sequence used in the SSB, and therefore the UE 120 maps the DMRS sequence to a value of a number of bits (e.g., 3).

In certain aspects, a number of bits (e.g., 14 bits) may be conveyed by the PBCH of the SSB, e.g. explicitly in a payload of the PBCH and/or implicitly (e.g., through PBCH scrambling (or redundancy version) where different scrambling sequences (redundancy versions) correspond to different values of a number of bits). For example, similar to the DMRS sequence, a UE 120 may try to descramble the PBCH using each of a number of different candidate sequences (e.g., 4 candidate sequences to convey 2 bits). The correct candidate sequence that decodes the PBCH in the SSB may be the sequence used for scrambling the PBCH, and therefore the UE 120 maps the sequence to a value of a number of bits (e.g., 2).

In certain aspects, the payload of the PBCH may be transmitted corresponding to a transmission timing interval (TTI) (e.g. a broadcast channel (BCH) TTI). For example, the payload of the PBCH may not change for a BCH TTI duration (e.g., 80 ms). This may allow the UE to combine multiple instances of received PBCH within the BCH TTI to improve the decoding performance. Accordingly, in certain aspects, the payload of the PBCH in multiple consecutive SS burst sets (e.g., 4) is the same. Therefore, a UE 120 receiving the SS burst sets with the same PBCH payload can combine the received PBCH payloads of the multiple SS burst sets to better decode the PBCH payload/improve detection (e.g., if there is low SNR, interference, etc.). In another example, the UE 120 may be able to test different sequences for descrambling PBCH over different SS burst sets, such as if the UE 120 does not have memory/processing capability to test all possible hypothesis sequences in a single SS burst set. However, in certain aspects, testing a number of different sequences may introduce complexity and latency for performing the blind decoding. Accordingly, certain aspects herein indicate to the UE 120 the PBCH scrambling sequence used in the SSB to allow the UE 120 to utilize the proper scrambling sequence to descramble PBCH without testing each possible sequence.

In some aspects, there is no DMRS randomization across a SS burst set, meaning for a given cell ID, the DMRS sequence used in a SSB is based solely on the SSB index. For example, if DMRS sequences 1-6 are in order for the SSBs in a SS burst set, the same DMRS sequences 1-6 are used in order for the SSBs in the following SS burst set. If there are two neighboring cells that are synchronized (or not) that transmit the SSB/DMRS on overlapping resources there may be collisions at the UE receiving the SSB/DMRS from each of the neighboring cells. If there is no DMRS randomization, then the same set of DMRS sequences are received from the neighboring cells (e.g., potentially a different DMRS sequence from each cell) for a given SSB index in each SS burst set. If the DMRS sequences of the set of DMRS sequences happen to have a high cross correlation, the UE 120 may not be able to properly detect the DMRS. Without DMRS randomization, this may lead to the UE 120 not being able to properly detect the DMRS for each SS burst set. With DMRS randomization, the chance that the DMRS sequences of the set have a high cross correlation in every SS burst set decreases, thereby potentially mitigating detecting issues.

In certain aspects, the DMRS indicates a logical SSB index of the SSB instead of the actual physical SSB index of the SSB. For example, as discussed, each SSB is physically located in time in a physical index order in the SS burst set. However, instead of the DMRS directly indicating the physical index of the SSB, the DMRS may indicate a logical SSB index that is mapped (e.g., by a function, table, etc.) to the physical SSB index of the SSB. For example, each physical SSB index may be mapped to a different value corresponding to a logical SSB index (e.g., 0, 1, 2, 3, 4, 5, 6, 7 are mapped to 2, 3, 4, 5, 6, 7, 0, 1, respectively). Therefore, in certain aspects, for a given SSB having a given physical SSB index, the DMRS sequence transmitted in the physical SSB index is based on the logical SSB index associated with the physical SSB index.

In certain aspects, the mapping from the physical SSB index to the logical SSB index is a function of some timing information of the cell. For example, the mapping may be a function of a SS burst set index within a BCH TTI the SSB is transmitted. As discussed, a number of consecutive sets of resources corresponding to SS burst sets may be used for transmitting in a BCH TTI, and each may have a set index of the plurality of sets of resources referred to as a SS burst set index corresponding to its position in the BCH TTI. Additionally or alternatively, the mapping from the physical SSB index to the logical SSB index is a function of a cell ID in which the SSB is transmitted.

By using the DMRS to indicate a logical SSB index instead of a physical SSB index certain advantages may be realized. For example, by basing the logical SSB index on the SS burst set index, there is DMRS randomization across different SS burst set indexes, thereby potentially mitigation detecting issues as discussed. However, in such an example, to map the logical SSB index to the physical SSB index, the UE 120 may need knowledge of the BCH TTI boundaries to know the SS burst set index. The UE 120 may determine such information regarding BCH TTI boundaries for a serving cell of the UE by decoding PBCH (which includes information about the SS burst set index), which UE 120 may need to perform anyway during initial cell acquisition. Further, for determining such information for a neighboring cell the UE may receive timing information of the neighboring cell from the serving cell explicitly as an indication, or may derive it based on the service cell timing where the serving cell and neighboring cell are synchronized within a maximum timing offset (e.g., within +/− 10 ms).

In certain aspects, the DMRS indicates a logical SSB index of the SSB instead of the actual physical SSB index of the SSB for only certain cells, frequency bands (e.g., above 6 GHz), numerologies (e.g., for 240 kHz tone spacing), deployments (e.g., deployments with synchronous cells), scenarios (e.g., non-standalone operation, initial acquisition synchronization, synchronization for a one or more UEs in an RRC-idle or RRC-connected mode), etc. In other situations, the DMRS may indicate the actual physical SSB index.

In certain aspects, the mapping of physical SSB index in a SS burst set to a logical SSB index in a SS burst set may not be dependent on the cell ID or the SS burst set index. In certain aspects, the physical to logical SSB index mapping may be according to the following equation (1):

$$l(p,c,b)=f(p) \forall p,c,b \quad (1)$$

Here, p is the physical SSB index of the SSB in a SS burst set (e.g., $p \in \{0,1, \ldots, L-1\}$ (e.g., L=4, 8, 64)); c is the cell ID of the cell the SSB is transmitted in (e.g., $c \in \{0,1, \ldots, 1007\}$); b is the SS burst set index (e.g. within BCH TTI) of the SS burst set the SSB is transmitted in (e.g., $b \in \{0,1,2,3\}$); l is the logical SSB index of the SSB in a SS burst set (e.g., $l(p, c, b) \in \{0,1, \ldots L'-1\}$ (e.g., L'=4,8,64), L' may be the same as or different from L); and $f$ (p) is a function of physical index p, for example $f(p)=p$ or f(p)=mod (p, L'). While in general, the logical index l can be a function of any combination of p, c, and b; in an example corresponding to equation 1, l does not depend on the cell ID c or SS burst set index b. In certain aspects, equation 1 provides no DMRS randomization. For example, the DMRS sequence indicates the physical SSB index such as shown according to the following table 1 based on equation 1 (where $f(p)=p$ and p=(0:7) for each b maps to l=(0,1,2,3,4,5,6,7)). In this table, l(0:7, c, b) is used to denote the sequence of logical SSB indices, for physical indices p=(0,1,2, . . . , 7), for a given cell ID c and SS burst set index b:

TABLE 1

| b | 0 | 1 | 2 | 3 |
|---|---|---|---|---|
| l(0:7, c, b) | (0, 1, 2, 3, 4, 5, 6, 7) | (0, 1, 2, 3, 4, 5, 6, 7) | (0, 1, 2, 3, 4, 5, 6, 7) | (0, 1, 2, 3, 4, 5, 6, 7) |

In certain aspects, the mapping of physical SSB index in a SS burst set to a logical SSB index in a SS burst set may be dependent on the burst set index. In certain aspects, the physical to logical index mapping may be according to the following equation (2):

$$l(p,c,b+1)=l(p,c,b)+\Delta \forall p,c,b \quad (2)$$

and for the burst set index b=0, the mapping may be $$l(p,c,0)=\mathrm{mod}(p,L') \; \forall p,c$$

Here, Δ may be a constant non-zero value (for example Δ=1,2, . . . , L'−1; more specifically Δ may be chosen such that a physical index maps to the same logical index at the beginning of each BCH TTI (e.g. Δ=2 when L'=8 and b=0,1,2,3)). The summation in equation 2 may be in modulo L', to make sure l takes values in (0,1, . . . , L'−1)). In certain aspects, equation 2 provides some DMRS randomization as the mapping of physical SSB index in a SS burst set index to a logical SSB index is based on the SS burst set index. For example, the mapping of physical SSB index to logical SSB index is different for different values of b such as shown according to the following table 2 based on equation 2 and for Δ=2:

TABLE 2

| b | 0 | 1 | 2 | 3 |
|---|---|---|---|---|
| l(0:7, c, b) | (0, 1, 2, 3, 4, 5, 6, 7) | (2, 3, 4, 5, 6, 7, 0, 1) | (4, 5, 6, 7, 0, 1, 2, 3) | (6, 7, 0, 1, 2, 3, 4, 5) |

In certain aspects, the design based on equation 2 exploits the directionality (e.g., beamforming) of SSB transmissions. For example, if two neighboring cells are each beamforming in different directions, then the UE 120 may receive SSB from one or both of the cells on only a particular SSB within a SSB burst. In this example, for each SS burst set index, different pairs of DMRS sequences (corresponding to the different logical SSB indexes) are transmitted for a given SSB index, thereby reducing the likelihood that the pair of DMRS sequences have a high correlation for the given SSB index in each SS burst set index.

In certain aspects, the design based on equation 2 allows a UE 120 to combine DMRS for SSBs both within the same and across different SSB bursts to perform hypothesis checking (to determine the actual DMRS sequence as discussed). In particular, the logical indices corresponding to the DMRS sequences in consecutive SSBs in a SSB burst are incremented by 1, so if the UE 120 can detect two consecutive or non-consecutive SSBs it knows the incrementing in logical index used for DMRS sequences and can combine the DMRS sequences. Similarly, DMRS sequences at the same physical SSB index in consecutive SS burst sets (e.g. at least within a BCH TTI) are incremented by $\Delta$, so the UE 120 can combine the DMRS sequences.

In certain aspects, the mapping of physical SSB index in a SS burst set to a logical SSB index in a SS burst set may depend on both cell ID and burst set index. In certain aspects, the physical to logical index mapping may be according to the following equation (3):

$$l(p,c,b+1)=l(p,c,b)+\delta(c) \ \forall p,c,b \qquad (3)$$

Where $\delta(c)$ is a value (e.g. in $0,1,\ldots,L'$) that depend on the cell id c. For example, we may have $\delta(c)=\text{mod}(c, L')$ and for the burst set index b=0, the mapping may be $$l(p,c,0)=\text{mod}(p,L') \not\in p,c$$

The summation in equation 3 may be in modulo $L'$, to make sure l takes values in $(0,1,\ldots,L'-1)$). In certain aspects, equation 3 provides additional DMRS randomization as the mapping of physical SSB index in a SS burst set to a logical SSB index is based on the cell ID and the SS burst set index. For example, the mapping of physical SSB index to logical SSB index is different for different values of b and c such as shown according to the following table 3 based on equation 3:

TABLE 3

| b | | 0 | 1 | 2 | 3 |
|---|---|---|---|---|---|
| mod(c, 8) | 0 | (0, 1, 2, 3, 4, 5, 6, 7) | (0, 1, 2, 3, 4, 5, 6, 7) | (0, 1, 2, 3, 4, 5, 6, 7) | (0, 1, 2, 3, 4, 5, 6, 7) |
| | 1 | (0, 1, 2, 3, 4, 5, 6, 7) | (1, 2, 3, 4, 5, 6, 7, 0) | (2, 3, 4, 5, 6, 7, 0, 1) | (3, 4, 5, 6, 7, 0, 1, 2) |
| | 2 | (0, 1, 2, 3, 4, 5, 6, 7) | (2, 3, 4, 5, 6, 7, 0, 1) | (4, 5, 6, 7, 0, 1, 2, 3) | (6, 7, 0, 1, 2, 3, 4, 5) |
| | 3 | (0, 1, 2, 3, 4, 5, 6, 7) | (3, 4, 5, 6, 7, 0, 1, 2) | (6, 7, 0, 1, 2, 3, 4, 5) | (1, 2, 3, 4, 5, 6, 7, 0) |
| | 4 | (0, 1, 2, 3, 4, 5, 6, 7) | (4, 5, 6, 7, 0, 1, 2, 3) | (0, 1, 2, 3, 4, 5, 6, 7) | (4, 5, 6, 7, 0, 1, 2, 3) |
| | 5 | (0, 1, 2, 3, 4, 5, 6, 7) | (5, 6, 7, 0, 1, 2, 3, 4) | (2, 3, 4, 5, 6, 7, 0, 1) | (7, 0, 1, 2, 3, 4, 5, 6) |
| | 6 | (0, 1, 2, 3, 4, 5, 6, 7) | (6, 7, 0, 1, 2, 3, 4, 5) | (4, 5, 6, 7, 0, 1, 2, 3) | (2, 3, 4, 5, 6, 7, 0, 1) |
| | 7 | (0, 1, 2, 3, 4, 5, 6, 7) | (7, 0, 1, 2, 3, 4, 5, 6) | (6, 7, 0, 1, 2, 3, 4, 5) | (5, 6, 7, 0, 1, 2, 3, 4) |

In certain aspects, the design based on equation 3 is similar to the design based on equation 2, except that the amount that logical SSB index of a SSB is incremented from one SSB burst index to the next is based on c and is not just a constant value $\Delta$ as in equation 2.

In certain aspects, the mapping of physical SSB index in a SS burst set to a logical SSB index in a SS burst set may be according to the following equation (4):

$$l(p,c,b+1)=l(p,c,b)+\delta(c,b) \not\in p,c,b \qquad (4)$$

and for the burst set index b=0, the mapping may be $$l(p,c,0)=\text{mod}(p,L') \not\in p,c$$

The summation in equation 4 may be in modulo $L'$, to make sure l takes values in $(0,1,\ldots,L'-1)$). In certain aspects, equation 4 provides additional DMRS randomization as the mapping of physical SSB index in a SS burst set to a logical SSB index is based on the cell ID and the SS burst set index similar to equation 3. However, instead of the amount that logical SSB index of a SSB is incremented from one SSB burst index to the next being based on c only as in equation 3, the amount that logical SSB index of a SSB is incremented from one SSB burst index to the next is based on b and c. Accordingly, in certain aspects, when the UE 120 receives DMRS sequences in the same or different physical SSB index in consecutive or non-consecutive SS burst sets, it can look at the difference between the DMRS sequences (e.g. the difference between the corresponding logical indices) and based on the difference determine the SS burst set index of the SS burst sets because the delta difference between the DMRS sequences is specific to the SS burst sets.

In certain aspects, for a given c, the value of $\delta(c, b)$ for each possible value (or at least some of the values) of b is different (e.g., $\delta(c, 0) \neq \delta(c,1) \neq \delta(c,2) \neq \delta(c,3)$) to allow the UE 120 to determine the SS burst set index at least partly based on two DMRS received in two different SS burst sets. In certain aspects, the summation of the values of $\delta(c, b)$ for each possible value of b modulo $L'$ is 0 in order to wrap around to the same initial state at the beginning of the next BCH TTI (e.g., $\text{mod}(\delta(c,0)+\delta(c,1)+\delta(c, 2)+\delta(c,3), 8)=0$). For example, the value of $\delta(c, b)$ may be based on equation 5 as follows:

$$\delta(c, b) = \begin{cases} \text{mod}(\text{mod}(c, 8) + 2b, 8) & \text{mod}(c, 2) = 1 \\ \text{mod}\left(\text{mod}(c, 8) + \frac{b(b+3)}{2}, 8\right) & \text{mod}(c, 2) = 0 \end{cases} \qquad (5)$$

For example, the mapping of physical SSB index to logical SSB index is different for different values of b and c such as shown according to the following table 4 based on equations 4 and 5:

TABLE 4

| b | | 0 | 1 | 2 | 3 | 4 |
|---|---|---|---|---|---|---|
| mod(c, 8) | 0 | (0, 1, 2, 3, 4, 5, 6, 7) | (0, 1, 2, 3, 4, 5, 6, 7) | (2, 3, 4, 5, 6, 7, 0, 1) | (7, 0, 1, 2, 3, 4, 5, 6) | (0, 1, 2, 3, 4, 5, 6, 7) |
| | 1 | (0, 1, 2, 3, 4, 5, 6, 7) | (1, 2, 3, 4, 5, 6, 7, 0) | (4, 5, 6, 7, 0, 1, 2, 3) | (1, 2, 3, 4, 5, 6, 7, 0) | (0, 1, 2, 3, 4, 5, 6, 7) |
| | 2 | (0, 1, 2, 3, 4, 5, 6, 7) | (2, 3, 4, 5, 6, 7, 0, 1) | (6, 7, 0, 1, 2, 3, 4, 5) | (5, 6, 7, 0, 1, 2, 3, 4) | (0, 1, 2, 3, 4, 5, 6, 7) |
| | 3 | (0, 1, 2, 3, 4, 5, 6, 7) | (3, 4, 5, 6, 7, 0, 1, 2) | (0, 1, 2, 3, 4, 5, 6, 7) | (7, 0, 1, 2, 3, 4, 5, 6) | (0, 1, 2, 3, 4, 5, 6, 7) |
| | 4 | (0, 1, 2, 3, 4, 5, 6, 7) | (4, 5, 6, 7, 0, 1, 2, 3) | (2, 3, 4, 5, 6, 7, 0, 1) | (3, 4, 5, 6, 7, 0, 1, 2) | (0, 1, 2, 3, 4, 5, 6, 7) |
| | 5 | (0, 1, 2, 3, 4, 5, 6, 7) | (5, 6, 7, 0, 1, 2, 3, 4) | (4, 5, 6, 7, 0, 1, 2, 3) | (5, 6, 7, 0, 1, 2, 3, 4) | (0, 1, 2, 3, 4, 5, 6, 7) |
| | 6 | (0, 1, 2, 3, 4, 5, 6, 7) | (6, 7, 0, 1, 2, 3, 4, 5) | (6, 7, 0, 1, 2, 3, 4, 5) | (1, 2, 3, 4, 5, 6, 7, 0) | (0, 1, 2, 3, 4, 5, 6, 7) |
| | 7 | (0, 1, 2, 3, 4, 5, 6, 7) | (7, 0, 1, 2, 3, 4, 5, 6) | (0, 1, 2, 3, 4, 5, 6, 7) | (3, 4, 5, 6, 7, 0, 1, 2) | (0, 1, 2, 3, 4, 5, 6, 7) |

In certain aspects, as discussed, the number L of SSB in a SS burst set is based on the frequency range of transmission. Accordingly, in certain aspects, the number of possible DMRS sequences (e.g., 8) per cell ID may be greater than the number of SSB (e.g., 4) in a SS burst set. Therefore, less than all of the defined DMRS sequences may be needed to indicate SSB index of the SSBs. Accordingly, in certain aspects, multiple DMRS sequences may be mapped to the same SSB index (e.g., logical or physical SSB index). The DMRS sequence selected of the multiple DMRS sequences to indicate a given SSB index, therefore, may be used to convey additional information. In certain aspects the additional information may be an extra bit. The extra bit may be used to indicate system information (e.g., extra timing information or non-timing information) about the cell. For example, the extra bit may indicate a part of the SFN and/or half-frame level timing (i.e., of the half-frame the SSB including DMRS is transmitted in). For example, the extra bit may indicate the part of the 10-bit SFN that indicates the halfway boundaries (e.g., 40 ms boundaries) in a BCH TTI. Accordingly, within a BCH TTI, the value of the bit for the consecutive SS burst sets with consecutive SS burst set indexes will be 0,0,1,1. Therefore, the sequence of the value of the bit for two consecutive SS burst sets will be 00, 01, 11, or 10, which are all different, and therefore can be used to determine the SS burst set index for the SS burst sets. In another example, the extra bit may indicate system configuration, operation mode (e.g., sync for initial acquisition, or for one or more UEs in idle/connected mode), sync burst set periodicity, SS burst set structure, information to indicate whether UE can camp on this cell, any information that can help UE in processing the PBCH channel, etc.

In another example, less than all of the defined DMRS sequences are transmitted to indicate SSB index, and therefore the UE 120 may need to perform hypothesis testing for only a subset of DMRS sequences. In certain aspects, the subset of DMRS sequences used may be dependent on cell ID or burst set index. The UE 120 may then need to perform hypothesis testing for all of the DMRS sequences, but can also then utilize the described logical to physical SSB index mapping techniques.

Figure 9:
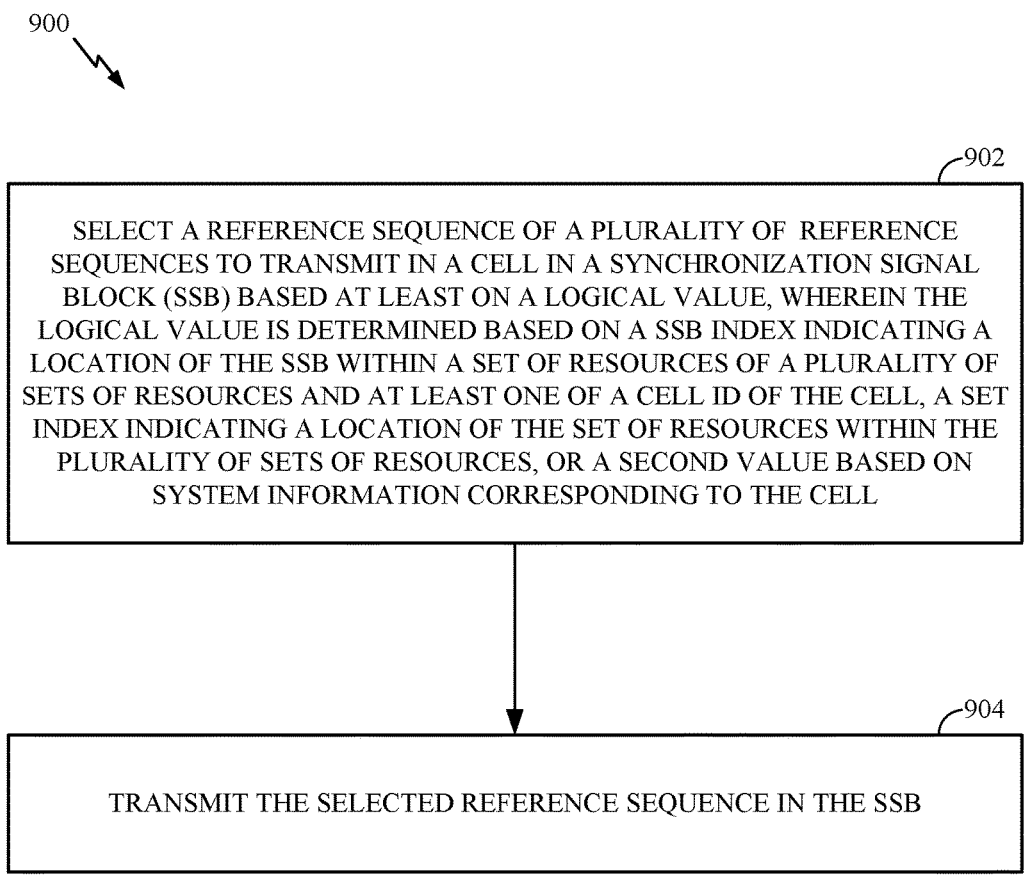
FIG. 9 illustrates example operations for wireless communications, for example, for generating and communicating reference signals, in accordance with certain aspects.

FIG. 9 illustrates example operations 900 for wireless communications, for example, for generating and communicating reference signals. According to certain aspects, operations 900 may be performed by a BS (e.g., one or more of the BSs 110).

Operations 900 begin at 902 where the BS selects a reference sequence of a plurality of reference sequences to transmit in a cell in a synchronization signal block (SSB) based at least on a logical value, wherein the logical value is determined based on a SSB index indicating a location of the SSB within a set of resources of a plurality of sets of resources and at least one of a cell ID of the cell, a set index indicating a location of the set of resources within the plurality of sets of resources, or a second value based on system information corresponding to the cell. At 904, the BS transmits the selected reference sequence in the SSB.

Figure 10:
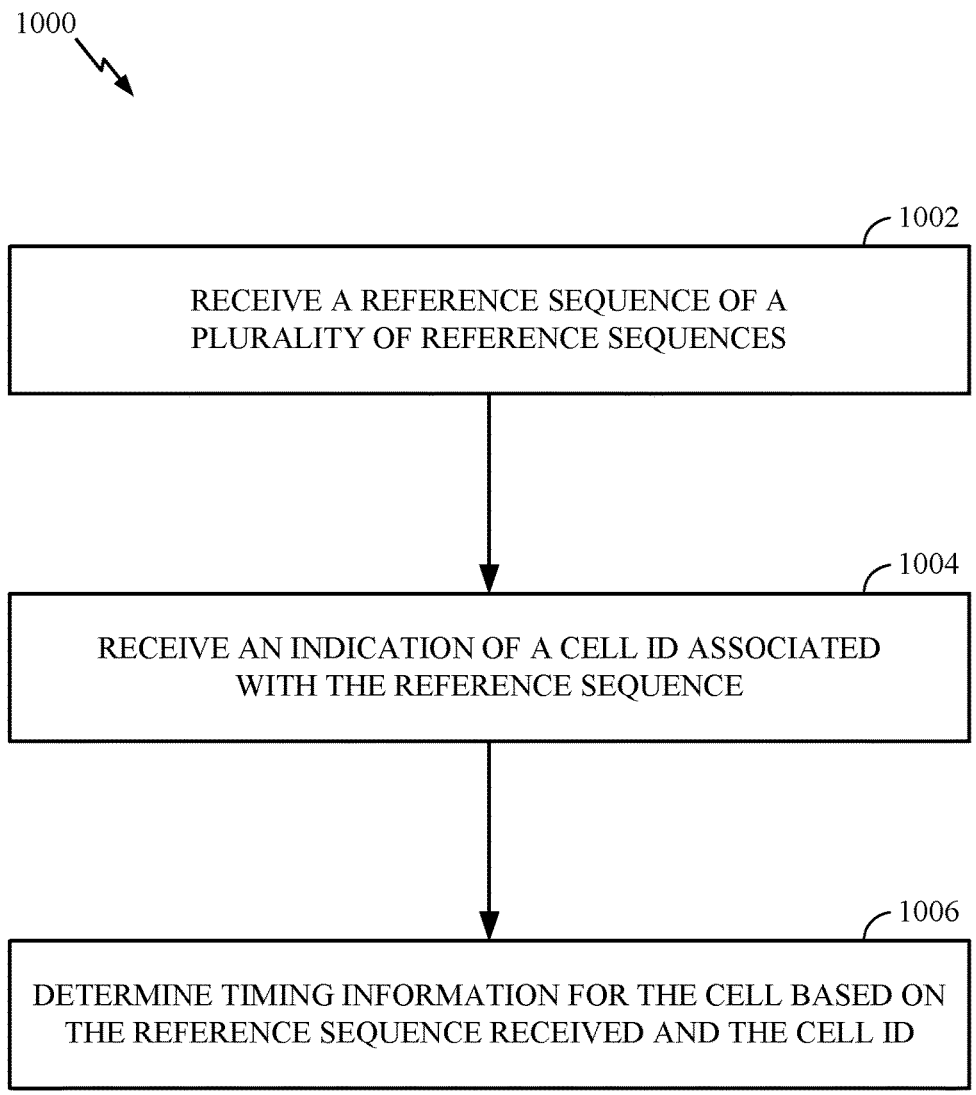
FIG. 10 illustrates example operations for wireless communications, for example, for receiving reference signals and determining timing information based on the reference signals, in accordance with certain aspects of the present disclosure.

FIG. 10 illustrates example operations 1000 for wireless communications, for example, for receiving reference signals and determining timing information based on the reference signals. According to certain aspects, operations 1000 may be performed by a user equipment (e.g., one or more of the UEs 120).

Operations 1000 begin at 1002 where the UE receives a reference sequence of a plurality of reference sequences. At 1004, the UE receives an indication of a cell ID associated with the reference sequence. At 1006, the UE determines timing information for the cell based on the reference sequence received and the cell ID. In certain aspects, the UE does not receive the cell ID. In certain aspects, the UE determines half-frame timing information for the cell based on the reference sequence received (e.g., in a SSB).

Figure 11:
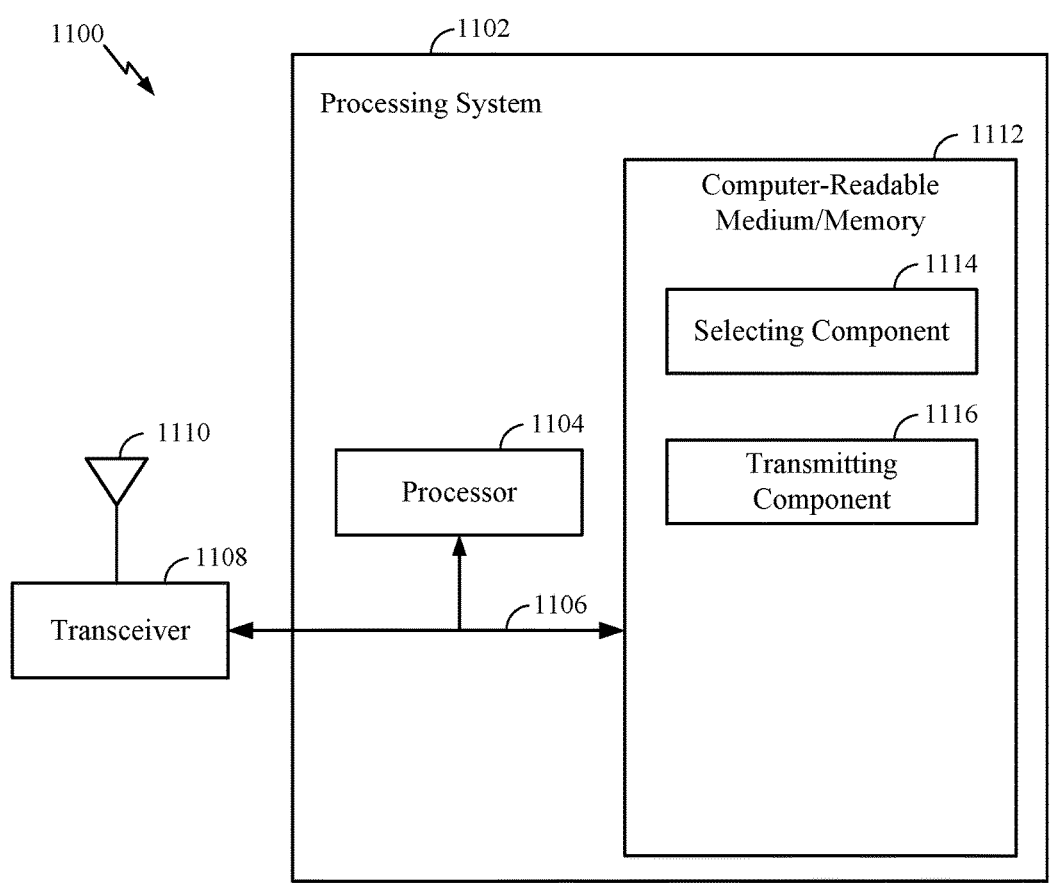
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIG. 9, or other operations for performing the various techniques discussed herein.

In certain aspects, the processing system 1102 further includes a selecting component 1114 for performing the operations illustrated in 902 of FIG. 9. Additionally, the processing system 1102 includes a transmitting component 1116 for performing the operations illustrated in 904 of FIG. 9. The selecting component 1114 and transmitting component 1116 may be coupled to the processor 1104 via bus 1106. In certain aspects, the selecting component 1114 and transmitting component 1116 may be hardware circuits. In certain aspects, selecting component 1114 and transmitting component 1116 may be software components that are executed and run on processor 1104.

Figure 12:
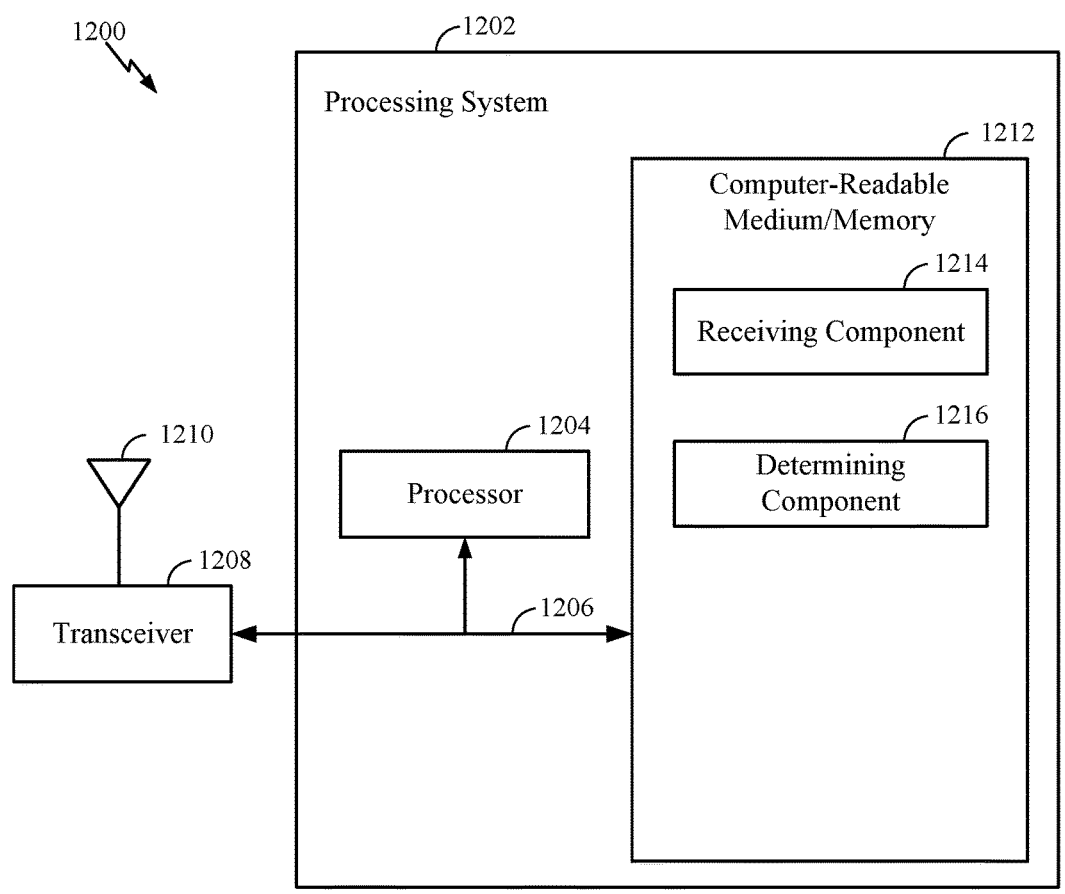
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIG. 10, or other operations for performing the various techniques discussed herein.

In certain aspects, the processing system 1202 further includes a receiving component 1214 for performing the operations illustrated in 1002 and 1004 of FIG. 10. Additionally, the processing system 1202 includes a determining component 1216 for performing the operations illustrated in 1006 of FIG. 10. The receiving component 1214 and determining component 1216 may be coupled to the processor 1204 via bus 1206. In certain aspects, the receiving component 1214 and determining component 1216 may be hardware circuits. In certain aspects, receiving component 1214 and determining component 1216 may be software components that are executed and run on processor 1204.

Figure 13:
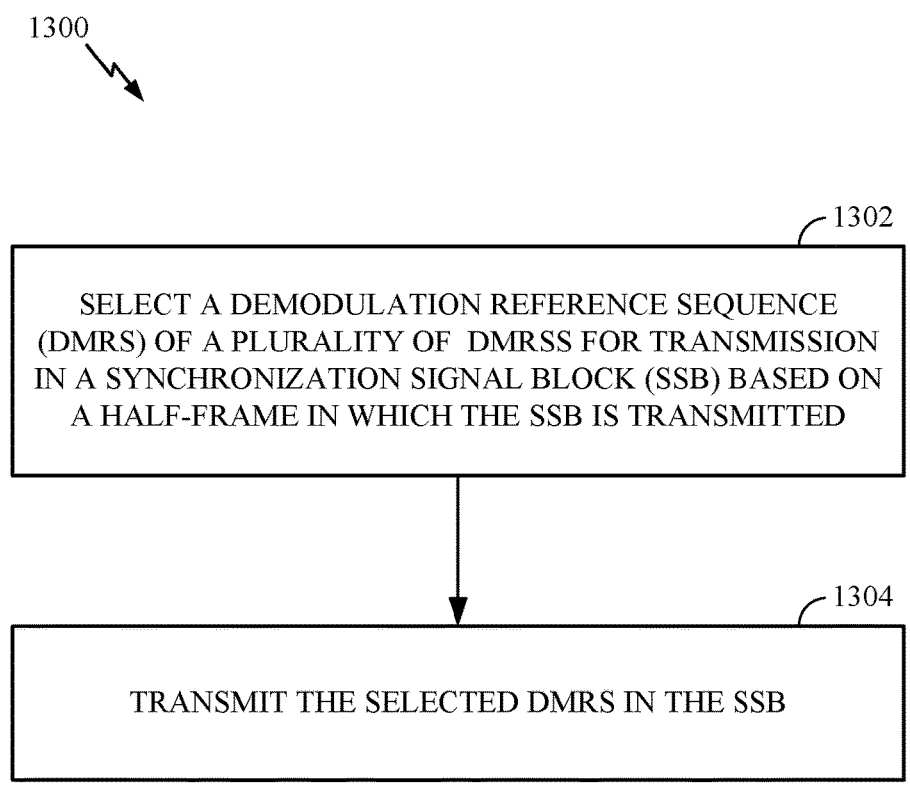
FIG. 13 illustrates example operations for wireless communications, for example, for generating and communicating reference signals, in accordance with certain aspects.

FIG. 13 illustrates example operations 1300 for wireless communications, for example, for generating and communicating reference signals. According to certain aspects, operations 1300 may be performed by a BS (e.g., one or more of the BSs 110).

Operations 1300 begin at 1302 where the BS selects a demodulation reference sequence (DMRS) of a plurality of DMRSs for transmission in a synchronization signal block (SSB) based on a half-frame in which the SSB is transmitted. At 1304, the BS transmits the selected DMRS in the SSB.

Figure 14:
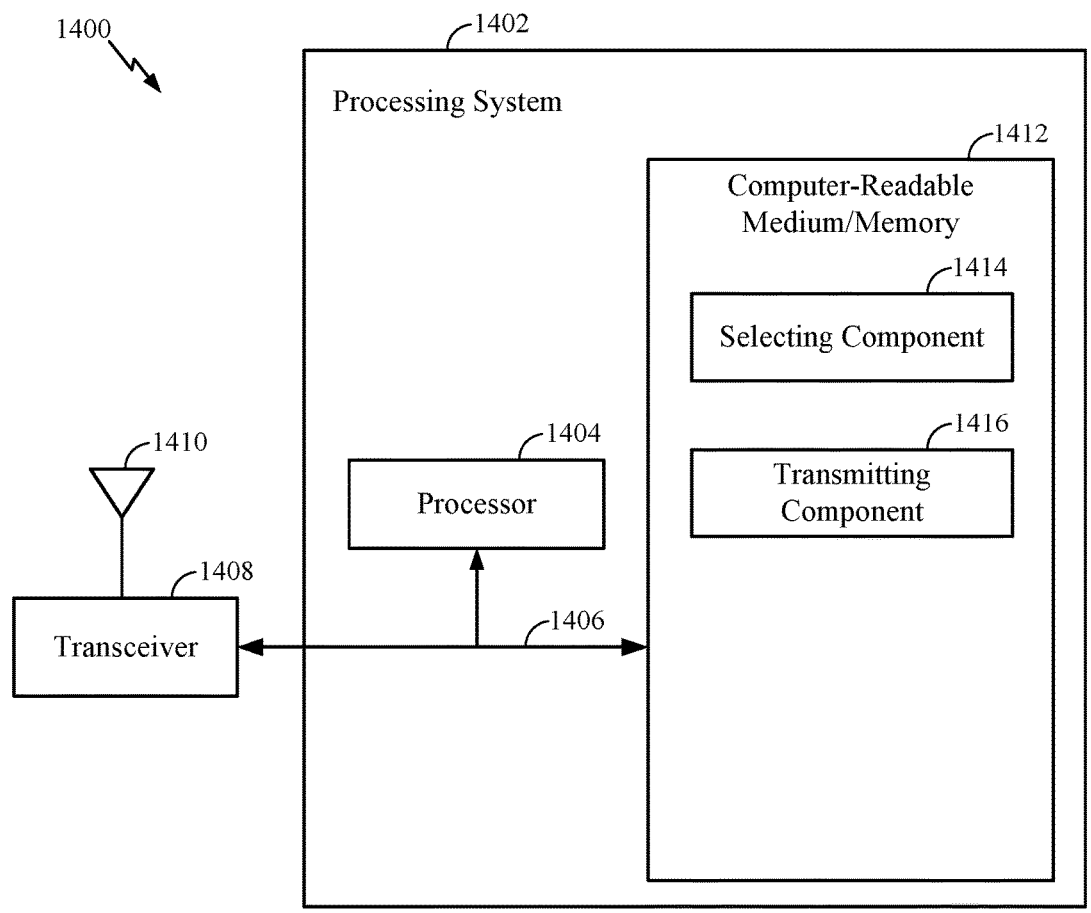
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 13. The communications device 1400 includes a processing system 1402 coupled to a transceiver 1408. The transceiver 1408 is configured to transmit and receive signals for the communications device 1400 via an antenna 1410, such as the various signal described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions that when executed by processor 1404, cause the processor 1404 to perform the operations illustrated in FIG. 13, or other operations for performing the various techniques discussed herein.

In certain aspects, the processing system 1402 further includes a selecting component 1414 for performing the operations illustrated in 1302 of FIG. 13. Additionally, the processing system 1402 includes a transmitting component 1416 for performing the operations illustrated in 1304 of FIG. 13. The selecting component 1414 and transmitting component 1416 may be coupled to the processor 1404 via bus 1406. In certain aspects, the selecting component 1414 and transmitting component 1416 may be hardware circuits. In certain aspects, selecting component 1414 and transmitting component 1416 may be software components that are executed and run on processor 1404.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9, 10, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communicating reference signals, the method comprising:
   selecting a demodulation reference sequence (DMRS) of a plurality of DMRSs for transmission in a synchronization signal block (SSB) based on a half-frame in which the SSB is transmitted; and
   transmitting the selected DMRS in the SSB.

2. The method of claim 1, wherein the half-frame is part of a system frame.

3. The method of claim 1, wherein the SSB is one of a plurality of SSBs in a synchronization signal (SS) burst set comprising four SSBs.

4. The method of claim 1, wherein the SSB includes a physical broadcast channel (PBCH).

5. The method of claim 1, wherein selecting the DMRS is further based on an index of the SSB.

6. The method of claim 3, wherein selecting the DMRS is further based on an index of the SSB.

7. The method of claim 6, wherein each of the plurality of SSBs is transmitted on a separate spatial beam.

8. A wireless device comprising:
a memory; and
a process configured to:
   select a demodulation reference sequence (DMRS) of a plurality of DMRSs for transmission in a synchronization signal block (SSB) based on a half-frame in which the SSB is transmitted; and
   transmit the selected DMRS in the SSB.

9. The wireless device of claim 8, wherein the half-frame is part of a system frame.

10. The wireless device of claim 8, wherein the SSB is one of a plurality of SSBs in a synchronization signal (SS) burst set comprising four SSBs.

11. The wireless device of claim 8, wherein the SSB includes a physical broadcast channel (PBCH).

12. The wireless device of claim 8, wherein selecting the DMRS is further based on an index of the SSB.

13. The wireless device of claim 10, wherein selecting the DMRS is further based on an index of the SSB.

14. The wireless device of claim 13, wherein each of the plurality of SSBs is transmitted on a separate spatial beam.

15. A wireless device comprising:
means for selecting a demodulation reference sequence (DMRS) of a plurality of DMRSs for transmission in a synchronization signal block (SSB) based on a half-frame in which the SSB is transmitted; and
means for transmitting the selected DMRS in the SSB.

16. The wireless device of claim 15, wherein the half-frame is part of a system frame.

17. The wireless device of claim 15, wherein the SSB is one of a plurality of SSBs in a synchronization signal (SS) burst set comprising four SSBs.

18. The wireless device of claim 15, wherein the SSB includes a physical broadcast channel (PBCH).

19. The wireless device of claim 15, wherein selecting the DMRS is further based on an index of the SSB.

20. The wireless device of claim 17, wherein selecting the DMRS is further based on an index of the SSB.

21. The wireless device of claim 20, wherein each of the plurality of SSBs is transmitted on a separate spatial beam.

22. A non-transitory computer readable storage medium that stores instructions that when executed by a wireless device cause the wireless device to perform a method for communicating reference signals, the method comprising:
selecting a demodulation reference sequence (DMRS) of a plurality of DMRSs for transmission in a synchronization signal block (SSB) based on a half-frame in which the SSB is transmitted; and
transmitting the selected DMRS in the SSB.

23. The non-transitory computer readable storage medium of claim 22, wherein the half-frame is part of a system frame.

24. The non-transitory computer readable storage medium of claim 22, wherein the SSB is one of a plurality of SSBs in a synchronization signal (SS) burst set comprising four SSBs.

25. The non-transitory computer readable storage medium of claim 22, wherein the SSB includes a physical broadcast channel (PBCH).

26. The non-transitory computer readable storage medium of claim 22, wherein selecting the DMRS is further based on an index of the SSB.

27. The non-transitory computer readable storage medium of claim 24, wherein selecting the DMRS is further based on an index of the SSB.

28. The non-transitory computer readable storage medium of claim 27, wherein each of the plurality of SSBs is transmitted on a separate spatial beam.

\* \* \* \* \*